Patented Mar. 10, 1953

2,631,155

UNITED STATES PATENT OFFICE 2,631,155

CRYSTALLINE CALCIUM ASCORBATE

Simon L. Ruskin, New York, N. Y., assignor to Physiological Chemicals Company, New Rochelle, N. Y., a corporation of New York No Drawing. Application October 3, 1946, Serial No. 701,061

3 Claims. (Cl. 260—343.7)

My invention relates to the manufacture of calcium ascorbate and more particularly to the preparation of this salt in crystalline form.

In prior methods for the preparation of calcium ascorbate, the salt was always obtained in the form either of a thick aqueous syrup or an amorphous powder; so far as I am aware, calcium ascorbate has never, prior to the present invention, been obtained in the form of definite crystals.

The calcium ascorbate powder heretofore prepared was highly hygroscopic, and on exposure to air it rapidly absorbed moisture and became gummy. The powder was yellow in color, which turned to orange when the salt was exposed to the atmosphere. This hygroscopicity was undesirable not only because it resulted in undesirably altering the physical appearance of the salt, and made air-tight packaging necessary, but it also promoted decomposition of the salt, such instability being highly undesirable because it reduced the therapeutic effectiveness of the salt and even tended to produce more or less toxic by-products.

It is the general object of the present invention to provide calcium ascorbate in the form of crystals which are characterized by a greatly reduced degree of hygroscopicity over the heretofore known powder, and by greater stability against decomposition and changes in color on exposure to the air.

It is a further object of the invention to provide an improved procedure whereby crystalline calcium ascorbate can be manufactured on a large scale, which procedure is inexpensive and yields the salt in a high state of purity.

Other objects will become apparent in the course of the following more detailed description of the invention.

The calcium ascorbate obtained in the dry form by prior procedures has always been in the form of an amorphous powder, and, as already stated, such powder was yellowish in color and turned darker on exposure to the atmosphere. I have found that crystalline calcium ascorbate, which can be used as such or employed for seeding solutions of the salt to produce crystallization when otherwise no crystallization would occur, can be prepared by first precipitating the salt in the form of an amorphous mass from its aqueous solution with the aid of a water-miscible organic solvent like acetone, and the precipitate, preferably after one or more extractions with the organic solvent, then taken up in a small quantity of water. From this strong aqueous solution of the salt a crystalline mass can be obtained on evaporation. Whereas heretofore on mixing of the amorphous calcium ascorbate with water a gummy mass was always obtained, in my improved process, apparently owing to the treatment with the water-miscible organic solvent, the substances which heretofore prevented crystallization are removed. The crystals so obtained contain water of hydration or of crystallization, which was never present in any solid calcium ascorbate prepared prior to my invention.

The crystals obtained with the aid of precipitation and extraction with a water-miscible organic solvent which, in addition to acetone, can be a lower aliphatic alcohol like ethyl and methyl alcohols differ, aside from their crystallinity, also in other physical properties from the salts prepared by Szent-Gyorgyi, Biochemical Journal, vol. 22 (1928) pages 1387-1409 and by Herbert et al., Journal of the Chem. Soc. (London) September 1933, pages 1278-1279.

In utilizing the crystals obtained with the aid of a water-miscible organic solvent, for the preparation of further batches of the crystals, it is necessary only to prepare a sufficiently concentrated solution of the salt in water. The salt is preferably prepared in fresh form by interacting ascorbic acid with a calcium base, like the carbonate or hydroxide. The crystals so obtained are white in color and remain so for an indefinite period.

In preparing the original crystals with the aid of a water-miscible organic solvent, I prefer to employ ethyl alcohol or acetone, as these solvents yield crystals which are practically snow white in appearance; while when methyl alcohol is employed, the crystals are slightly yellowish in color. However, even these crystals, when employed for seeding a saturated aqueous solution of calcium ascorbate, will yield substantially snow-white crystals of the salt.

The invention will be further described with the aid of the following examples which are presented purely for purposes of illustration and not as indicating the scope of the invention.

Example 1

60 g. ascorbic acid were dissolved in 140 cc. of hot water and cooled to 30° C. To the solution were then added slowly with stirring 16.3 g. calcium carbonate (a little less than ½ mole) and the mixture filtered with suction after $CO_2$ evolution had subsided. (The suction removes $CO_2$ which otherwise precipitates calcium carbonate when the solution is added to acetone.) The clear filtrate was pipetted with stirring into 3000 cc. of acetone. Some gum formed at the bottom but there was considerable flocculent precipitate. The gum was kneaded with a stirring rod in the acetone and began to harden. The following day the gum had become brittle and adherent to the beaker and had to be scraped off. The acetone was decanted and about 300 cc. fresh acetone were added to the precipitate. This was filtered and the precipitate ground up and then treated with 100 cc. more acetone, filtered again, ground up in a mortar, taken up in 200 cc. ether to remove acetone, filtered, and then dried in air. After the ether had evaporated, the residue was placed in a desiccator. The result was a pure amorphous powder of calcium ascorbate.

To 1 g. of this powder there was added 0.5 cc. of water. On evaporation of the water, a stiff mass resulted. This was very unusual because in my previous experience with calcium ascorbate, covering a period of many years, a gum always resulted on the addition of similar proportions of water to calcium ascorbate, or when the calcium ascorbate was exposed to the moisture of the air.

The stiff mass was examined under the microscope and was found to be a large clump of crystals different in appearance from anything previously observed. Analysis showed that the crystals held two molecules of water of hydration or crystallization.

After securing this first batch of crystals it was easy to secure subsequent crystallization.

This is a phenomenon well known in crystallography, namely, that once crystals have been obtained they can easily be secured subsequently. By the use of seeds thus obtained, crystallization can be induced in syrups that otherwise would not crystallize. Using this technique, crystallization was obtained in aqueous syrups of calcium ascorbate, as will now be described.

*Example 2*

60 g. of ascorbic acid were dissolved in 140 cc. of hot water which was then cooled to 25° to 30° C. and 16.3 g. calcium carbonate added. The mixture was filtered with suction and the filtrate evaporated in vacuo to a syrup. This was now seeded with a small amount of the crystals obtained according to Example 1, and in a few minutes the syrup solidified into a solid mass of crystals. After about 1 hour, the mother liquor was filtered off with suction and the crystals pressed to remove as much of the mother liquor as possible. This was completed by washing with 400 cc. of absolute ethyl alcohol to remove all the moisture. On drying, the crystals remained white. This was quite unusual since the color of the amorphous calcium ascorbate always turned light yellow or cream on exposure to air and it soon became gummy and difficult to handle.

The analysis of the crystalline calcium ascorbate was as follows:

|  | Theory (calculated to 2 molecule $H_2O$) | Found |
| --- | --- | --- |
| Carbon | 33.8 | 33.48 |
| Hydrogen | 4.25 | 4.24 |
| Calcium | 9.41 | 9.42 |
| Ascorbic acid by Iodine titration | 82.6 | 81.95 |
| Specific Rotation |  | $[\alpha]_D^{20} = +95.1$ in water (2.4 g. per 100 cc). |

The crystals showed a well-defined and characteristic X-ray diffraction spectrum.

Following the isolation of the crystals, alternative procedures employing ethyl alcohol or isopropyl alcohol may be used to remove the moisture adhering to the crystals.

*Example 3*

60 g. of ascorbic acid were dissolved in 140 cc. hot water and cooled to 25° C. To this solution there were added 16.3 g. calcium carbonate (½ mole), the mixture filtered with suction to remove $CO_2$, and nitrogen gas passed through for 15 minutes to remove remaining $CO_2$. There were then added slowly with stirring 235 cc. of ethyl alcohol. The solution was seeded with calcium ascorbate crystals and stirred. After standing about 2 hours beautiful, colorless prismatic crystals formed. The crystals were filtered and washed three times with 35 cc. dilute alcohol (170 cc. absolute alcohol to 100 cc. $H_2O$) then twice with 35 cc. absolute alcohol. Clear white crystals were obtained.

Ascorbic acid titration was 81.8% with iodine.

As already indicated, the original precipitate can be obtained by employing ethyl or methyl alcohol in place of the acetone of Example 1; while other volatile water-miscible organic solvents, like methyl alcohol can be used in addition to ethyl and isopropyl alcohols and acetone to remove moisture adhering to the crystals in order to dry them.

It is to be noted that whereas in Example 1 the quantity of organic solvent (acetone) is such that precipitation of the calcium ascorbate occurs, in Example 3 the quantity of added water-miscible organic solvent (in the example, ethyl alcohol), is insufficient in relation to the quantity of water, to cause precipitation of the salt.

The X-ray diagram of the crystals showed definitely crystalline properties. The diagram was taken in a 57.3 mm. radius camera with copper radiation ($\lambda = 1.54$ A.) nickel filter. The spacings of the first 16 lines in angstrom units were as follows ($\pm$ about 1 per cent):

| $\frac{d}{n}$ | 7.20 | 5.73 | 5.38 | 4.82 | 4.67 | 4.19 | 4.05 | 3.92 |
| --- | --- | --- | --- | --- | --- | --- | --- | --- |
| Intensity | v.s | w-m | w | m | w | s | m | w-m |

| $\frac{d}{n}$ | 3.72 | 3.49 | 3.27 | 3.15 | 2.99 | 2.95 | 2.79 | 2.71 |
| --- | --- | --- | --- | --- | --- | --- | --- | --- |
| Intensity | m-s | m-s | m-s | m | v.w | w | s | w | s—strong; m—medium; v—very; w—weak.

It will be evident that variations from the specific disclosures hereinabove made may be resorted to within the scope of the appended claims without departing from the spirit of the invention.

I claim:

1. Process for the manufacture of a new and stable form of calcium ascorbate, which comprises mixing a solution of calcium ascorbate in water with a quantity of acetone insufficient to cause precipitation of the calcium ascorbate, and seeding the solution with calcium ascorbate crystals to cause the formation of a crystalline precipitate of calcium ascorbate dihydrate.

2. Process for the manufacture of a new and stable form of calcium ascorbate, which comprises mixing a solution of calcium ascorbate in water with a sufficient amount of acetone to produce a precipitate of calcium ascorbate, collecting the precipitate and extracting the same with acetone, dissolving the residue in a relatively small quantity of water to produce a concentrated solution of the salt, and evaporating the water until a mass of crystals is produced.

3. Process for the manufacture of a new and stable form of calcium ascorbate, which comprises mixing a solution of calcium ascorbate in water with a sufficient amount of acetone to produce a precipitate of calcium ascorbate, collecting the precipitate and extracting the same with acetone, dissolving the residue in a relatively small quantity of water to produce a concentrated solution of the salt, evaporating the water until a mass of crystals is produced, separately preparing a substantially saturated solution of calcium ascorbate, and utilizing the crystals for seeding such solution to produce a stable, crystalline, hydrated form of calcium ascorbate.

SIMON L. RUSKIN.

REFERENCES CITED

The following references are of record in the file of this patent:

UNITED STATES PATENTS

| Number | Name | Date |
| --- | --- | --- |
| 2,117,777 | Warnat | May 17, 1938 |
| 2,233,417 | King | Mar. 4, 1941 |
| 2,265,121 | Reichstein | Dec. 2, 1941 |
| 2,400,171 | Ruskin | May 14, 1946 |

OTHER REFERENCES

Norris: Expt'l. Organic Chemistry, 1924, pages 3, 4 and 5.

Herbert et al.: J. Chem. Soc., pp. 1278–1279 (1933).

Szent-Gyorgyi: Biochem. Journ. 22, 1387–1409 (1928).